Aug. 17, 1965  G. D. RATLIFF, JR  3,200,756
VARIABLE DISPLACEMENT MOTORS AND SPEED CONTROLS THEREFOR
Filed Oct. 15, 1962
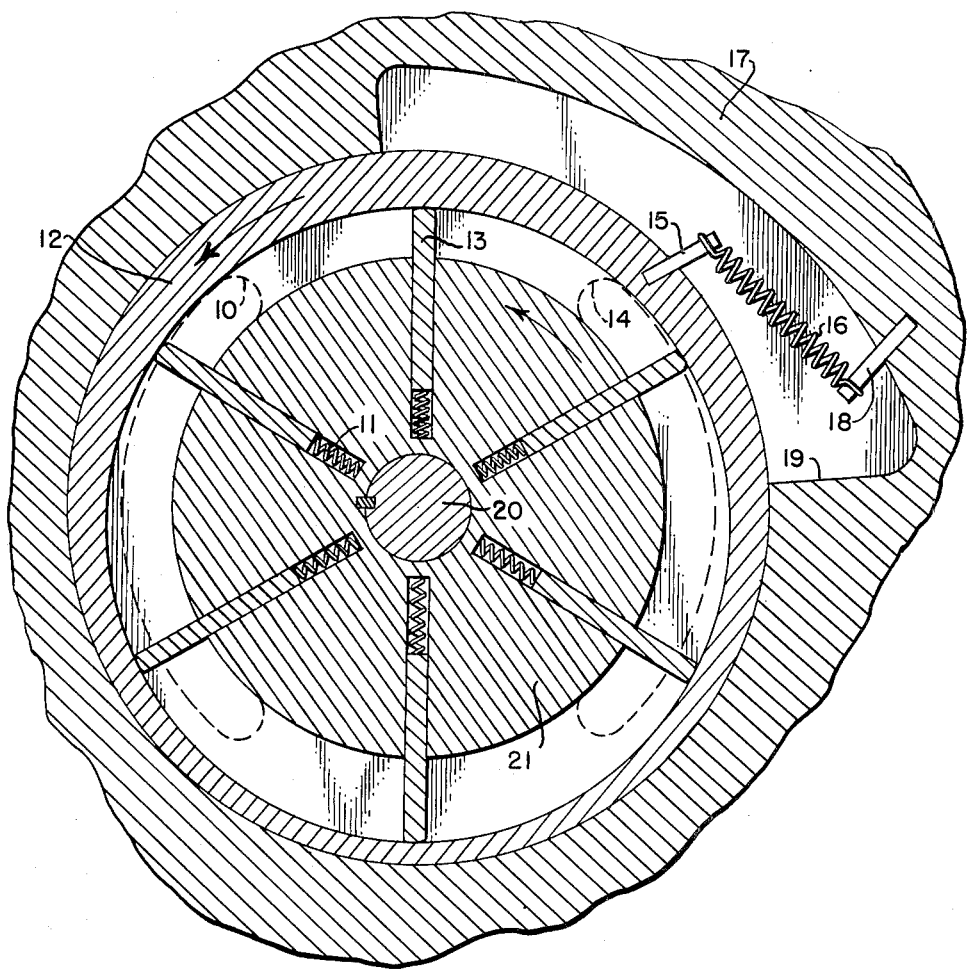
INVENTOR
George D. Ratliff, Jr.

3,200,756
VARIABLE DISPLACEMENT MOTORS AND SPEED CONTROLS THEREFOR
George D. Ratliff, Jr., Churchill Borough, Pa.
(23140 Forest Drive, Pittsburgh, Pa.)
Filed Oct. 15, 1962, Ser. No. 230,763
4 Claims. (Cl. 103—120)

This invention relates to improvements in variable displacement rotary motors and more particularly concerns novel speed control for motors of this type. This motor may be applied to many different uses, as for instance to automobiles in each wheel where it provides automatic power transmission and differential speed control to each wheel with flexible hoses connected to the power source instead of the usual rigid drive shafts.

An important object of the present invention is to control the displacement of a variable displacement rotary motor by effecting movement of a displacement modulator automatically responsive to variations in rotor speed of the motor itself.

Another object of the invention is to provide for the automatic rotary adjustment of a modulator ring of a variable displacement motor to maintain a favorable mechanical advantage.

Other objects, features, and advantages of the present invention will be readily apparent from the following detailed description of certain preferred embodiments thereof taken in conjunction with the accompanying drawing.

The drawing is a fragmentary sectional detail view through a variable displacement motor embodying the principles of the invention.

The motor embodying the control according to the present invention comprises a shaft 20, a cylindrical rotor 21, secured to the shaft 20, radial blades or vanes 13, carried by the rotor 21, a chamber bounded by the modulator ring 12 in which the rotor 21 and blades 13 revolve. The end walls of the chamber between the rotor and modulator are plane and perpendicular to the axis of the rotor, between which the rotor and blades fit with minimum clearance sufficient for lubricated movement. The clearances may be small enough to prevent appreciable leakage or, if necessary, the rotor and blades may be provided with packing means of known or other suitable character for this purpose. The blades are under constant pressure acting to force them outward against the modulator, such pressure being applied in any suitable way, as hydraulically, by spring means or otherwise. Here I have shown conventional helical springs as typifying any means for that purpose.

The annulus modulator member 12 operatively encircling the rotor chamber is a generally ring-shaped member encompassed by the inner circular bearing surface of the housing 17, and in slidable bearing relation with the housing. The inner surface of the modulator 12 is eccentric with the outer surface of the modulator. By reason of the eccentricity, rotary movement of the modulator will cause eccentric adjustment of a motor chamber space between the rotor 21 and the modulator 12.

A recess or chamber 19 in the surrounding housing 17 provides space for the biasing spring 16. A pin or boss 15 secured to the modulator ring 12 projects into the chamber 19 and serves as a means of attaching the spring 16 to the modulator 12. The helical tension spring 16 is secured at the ends to pins 15 and 18 fastened respectively to the modulator 12 and housing 17.

Although a helical spring is shown in the drawing as the preferred counterforce acting on the modulator ring, it is understood that other means such as pistons of electromagnets or different kinds of springs may be substituted.

The modulator ring 12 responds to the frictional drag between the vanes 13 and the inner surface of the modulator ring 12. When the rotor 21 is rotating slowly, there is not as much frictional drag between the vanes 13 and inner surface of modulator ring 12 as there is when the rotor 21 is rotating more rapidly. The change is due to the change in centrifugal force on the vanes 13. As a consequence of greater centrifugal force on the blades 13, there is greater impingement of the blades 13 on the inner surface of modulator ring 12. Greater impingement causes greater frictional drag which moves the modulator 12 in the direction indicated by arrows until spring 16 tension is increased enough to balance the increased frictional drag.

As shown in this example the modulator ring 12 is positioned for maximum eccentricity of the rotor 21 and the blades 13 with respect to the chamber between the modulator 12 and rotor 21. An increase in the speed of the axle 20 will decrease the eccentricity and thereby decrease the mechanical advantage of the motor.

It will be understood that suitable dampening devices may be employed to eliminate sudden movements of the modulator ring 12.

Although the above described invention has been termed a motor, it readily is apparent that the axle may be driven by an external power source instead of the fluid being driven by an external power source. It follows then that this invention applies equally well to pumps as well as to motors.

I claim as my invention:
1. In combination in a variable fluid displacement device of the character described, a rotor, a modulator providing a chamber normally eccentrically disposed relative to the rotor, a housing providing bearing surfaces for and rotatably supporting said modulator member in face-to-face relation, said modulator being mounted for adjustment relative to the rotor to vary the relative fluid displacement eccentricity of the chamber and the rotor in operation, means to bias the modulator adjustment in one direction, and a plurality of vanes held with respect to rotation relative to the rotor but movable radially to maintain slidable contact with the modulator.

2. A rotary device as described in claim 1 wherein the modulator is biased by means of a spring.

3. A rotary device as described in claim 1 wherein the vanes are held by radially disposed guide slots in the rotor, said slots opening outwardly and angularly spaced apart so that the vanes are guided in the slots, and means for biasing said vanes outwardly against the modulator.

4. A rotary device as described in claim 3 wherein each vane is biased outwardly against said modulator by means of a spring operatively pressing against said vane and the corresponding slot.

References Cited by the Examiner
UNITED STATES PATENTS

| | | | |
|---|---|---|---|
| 1,470,030 | 10/23 | Rolaff | 230—152 |
| 2,426,491 | 8/47 | Dillon | 103—120 |
| 2,474,348 | 6/49 | Czerner | 91—75 |
| 2,606,503 | 8/52 | Shaw | 103—120 |
| 2,658,456 | 11/53 | Wahlmark | 103—120 |
| 2,669,189 | 2/54 | DeLancey et al. | 103—136 |
| 2,685,842 | 8/54 | Hufferd | 103—120 |
| 2,700,341 | 1/55 | Smirl | 103—120 |
| 2,716,946 | 9/55 | Hardy | 103—120 |
| 2,768,585 | 10/56 | Hardy | 103—120 |
| 2,907,279 | 10/59 | Carleton | 103—120 |

FOREIGN PATENTS
1,261,079  4/61  France.

KARL J. ALBRECHT, Primary Examiner.
JOSEPH H. BRANSON, Jr., Examiner.